United States Patent [19]
Krieger

[11] Patent Number: 5,935,312
[45] Date of Patent: Aug. 10, 1999

[54] RESIN-BASED DISPERSION ADHESIVE

[75] Inventor: Roland Krieger, Ulm, Germany

[73] Assignee: Uzin Utz Aktiengesellschaft, Ulm, Germany

[21] Appl. No.: 08/981,512

[22] PCT Filed: Apr. 22, 1997

[86] PCT No.: PCT/EP97/02033

§ 371 Date: Apr. 3, 1998

§ 102(e) Date: Apr. 3, 1998

[87] PCT Pub. No.: WO97/40117

PCT Pub. Date: Oct. 30, 1997

[30]     Foreign Application Priority Data

Apr. 23, 1996 [DE]  Germany ............... 196 16 106

[51] Int. Cl.⁶ ............... C09D 193/00; C09D 193/04; C09D 191/00
[52] U.S. Cl. ............... 106/220; 106/221; 106/311; 524/270
[58] Field of Search ............... 106/220, 221, 106/311; 524/270

[56]     References Cited

U.S. PATENT DOCUMENTS

| | | | |
|---|---|---|---|
| 4,731,402 | 3/1988 | Penzel et al. | 524/273 |
| 4,740,324 | 4/1988 | Schur | 252/56 R |
| 5,149,741 | 9/1992 | Alper | 525/95 |
| 5,169,889 | 12/1992 | Kauffman et al. | 524/270 |
| 5,534,571 | 7/1996 | Aydin et al. | 524/272 |

*Primary Examiner*—David Brunsman
*Attorney, Agent, or Firm*—Townsend and Townsend and Crew LLP

[57]     ABSTRACT

Compositions of resins and oils of vegetable origin may be advantageously used to produce low-emission dispersion glues with appropriately adjustable adhesive properties which are particularly suitable for gluing floorings, wall and ceiling linings for indoor spaces.

76 Claims, No Drawings

RESIN-BASED DISPERSION ADHESIVE

The present invention relates to dispersion adhesives containing aequous polymer dispersions known per se and optionally additional additives known per se, to which resin preparations according to the invention are added during the production thereof to specifically adjust the tackiness.

Adhesives may be prepared by dissolving suitable synthetic resins, natural resins or polymers in volatile organic solvents. The adhesive effect occurs following application of the adhesives and joining of the substrates to be joined by physical evaporation of the solvent and the remaining of the solid adhesive components.

Evaporation of the solvents has been the reason for short term and long term emissions of volatile organic compounds (VOC) into the ambient air and the environment, respectively. For a number of health and ecological reasons such VOC emissions are undesirable. Adhesives on the basis of water based polymer, plastic or synthetic resin dispersions are increasingly used in order to avoid such emissions. The solidification of which occurs during the evaporation of the water contained therein. Such adhesives are referred to as dispersion adhesives.

For dispersion adhesives in most cases no initial tackiness is required, e.g. in the numerous industrial manufacturing uses in which the parts to be joined may be clamped, pressed or fixed until the solidification of the adhesive and optionally also the setting of the adhesive can be accelerated by applying additional heat. Typical examples for these types of adhesives are packaging adhesives, paper adhesives or wood adhesives.

Other dispersion adhesives are used in fields in which a fixation of the parts to be joined or an accelerated thermal setting is impossible. In this case the adhesives must exibit sufficient initial tackiness immediately or shortly after the joining to fix the parts to be joined before the setting of the adhesive occurs. A typical field demonstrating said requirements is for example the adhesion of floor coverings, wall coverings and ceiling coverings in interiors.

Typically, in the preparation of dispersion adhesives tackifying resins are incorporated therein to provide said dispersion adhesives with the required initial tackiness. For this purpose natural resins, such as colophonium, and natural resin esters as well as mixtures thereof are preferably used. The selection of the resins available in a variety of forms depends on the requirements made on the adhesive and is familiar to the skilled artisan.

In the process for the preparation of the adhesive the resins present in solid up to viscous form must be brought into a form which is sufficiently liquid to be mixed into the dispersion preparation, which is also present in liquid form. Typically, to acquire said liquid form of the resins, there is prepared in a separate operation step a liquid resin preparation, which then is incorporated into the mixture of the other adhesive components.

Liquid resin preparations of this type are prepared according to known prior art by dissolving the resins in highly volatile organic solvents. The resin solutions obtained in this manner are incorporated into the mixture of the other adhesive components at room temperature. However, this method results in the introduction of volatile organic solvents into the adhesive, which are referred to as low solvent or solvent containing dispersion adhesives, depending on the proportion of the solvent.

Generally, the highly volatile solvents used exhibit a boiling point below 200° C. and a steam pressure of more than 100 Pa under normal conditions. The evaporation of which already occurs partly during or immediately after the application of the adhesive, partly in the course of weeks and months, and is the reason for high voc emissions and contamination of the ambient air, which regarding working, environmental and consumer protection represent a substantial problem and are thererore undesirable.

EP 0 221 461 describes such a method, in which tackifying resins are used in the form of 70% solutions in toluene. The toluene proportion thus introduced into the adhesive may lead to substantial toluene emissions over longer periods of time. The same applies to other highly volatile solvents.

According to other known but developed methods to avoid highly volatile solvent components the resins are dissolved in liquid organic compounds having a boiling point between 200 and 250° C. and therefore being referred to as high boilers,.

U.S. Pat. No. 4,654,388 describes a method in which a resin preparation containig colophonium and colophonium esters is used in association with diethylene glycol monobutyl ether. Under normal conditions diethylene glycol monobutyl ether has a steam pressure of about 2.7 Pa and accordingly leads to persistent emissions from adhesives made thereof.

In DE 4 039 781, there is described for the production of resin preparations the concomitant use of substances of i the general formula $R^1-O-(X-O)_n-R^2$, in which X is an alkylene having 2 to 4 C atoms, n is an integer from 1 to 8, $R^1$ and $R^2$ are hydrogen or an aryl or alkylaryl group having 6 to 12 C atoms, wherein $R^1$ and $R^2$ do not represent hydrogen simultaneously. However, it has been shown, that n should preferably be 1, wherein the example mentioned of the monophenyl glycol ether represents a substance having a steam pressure of 4 Pa under normal conditions, which leads to persistent emissions as well. If n is higher, as shown in the case of n=25 for a cresol and propylene oxide addition product, the adhesive properties of the adhesives made thereof tend to greatly decrease.

The substances proposed in these publications for the production of resin preparations as well as all other high boilers known to be suitable for this purpose, such as butyl diglycol acetate, still exhibit a measurable steam pressure of above 0.5 Pa under normal conditions. Due to their lower volatility, said substances do not lead to immediate emissions relevant for working protection, but may evaporate over longer periods of time and, thus, contaminate the ambient air. Although the high boilers themselves are not classified as noxious or toxic and emit only in concentrations considered to be harmless, the resulting contaminations of the ambient air are really undesirable in an environment becoming increasingly more discerning.

Besides the unsolved emission problems the high boilers used in resin preparations show a further undesirable side effect. Due to their lower volatility said high boilers remain in the adhesives made thereof over longer periods of time, but tend to migrate into the glued substrates due to their relatively low molecular size. Thus, said high boilers have been associated with the softening of elastic floor coverings, with chemical interaction with floor covering components and with the development of odour.

According to other known processes, e.g. EP 0 620 243, the resins themselves are dispersed in water by using dispersion auxiliaries and are added to the polymer dispersion as an aequous resin dispersion.

In no way, water as a volatile carrier medium interferes in this case, however, the presence of hydrophilic and stabilizing dispersion agents, respectively, has a negative effect on the sufficiently rapid development of the adhesive force and the application relevant properties of the resulting adhesives.

In EP 255 637, there is described an adhesive oil, containing as a lubricating oil at least one vegetable oil and/or at least one animal oil and as an adhesive promotor a colophonium containing resin and/or colophonium. The lubricating oil to adhesive promotor ratio is described in the wide range of 40–90:60–10. While the function of the oil as a lubricant is of immediate importance, the resin only has auxiliary function, i.e. it increases the adhesion of the lubricating oil. One object of this publication is lubricating, i.e. a problem diametrically opposed to adhesion. Thus, in the prefered mixing ratios the lubricant predominates the adhesion promotor. In no way, said publication suggests the use of the preparation claimed as an adhesive or as a component of adhesives, especially in aequous dispersion adhesives. The object of the present invention is contradictory, since the tackifying effect of the resins is in the limelight, and on the other hand, the oil only has auxiliary function, namely as a liquifying agent. Furthermore, said publication does not claim the avoidance of volatile components.

EP 213 386 describes adhesive dispersions for tile surfaces also using synthetic adhesive resins. The use of oils of vegetable origin alone or in combination with colophonium resins is not mentioned.

FR 2 543 564 describes reactive dispersion adhesives on the basis of epoxy resins. In the claims of this publication epoxidized soya oil is mentioned as a liquid carrier for the solid amine catalyst. Epoxidized soya oil is a synthetically prepared reactive vegetable oil containing epoxy groups, which has nothing in common with the oils of the present invention. Nothing is said about the use of chemically unaltered natural oils or esterified natural fatty acid mixtures alone or in combination with colophonium resins.

FR 2 155 658 describes the concomitant use of resins having an adhesive force enhancing effect in polychloroprene dispersions free of solvent. Among others, colophonium and colophonium esters are mentioned as resins. Said resins are dissolved in monomeric chloroprene or dispersed in water for the production of a resin preparation. Beyond the resin preparations already described as known above in the form of solutions in volatile organic solvents or in the form of aequous resin emulsions, no evidence is given which would suggest the present invention in any way. Especially nothing is said about the use of oils of vegetable origin.

FR 1 504 067 describes copying paper, in which i.a. castor oil is also used as a lubricating component in the colour layer. Apart from the fact that in this case also the lubricating dehesive character of the oil is most important, however, there is neither mentioned the use of colophonium resins or the advantageous combination of such resins with oils of vegetable origin, respectively, nor their use in aequous dispersion adhesives.

U.S. Pat. No. 5,288,780 describes chlorinated polyolefins dispersed in water as primers for polyethylene/polypropylene plastics. This document exclusively mentions emulsions of synthetic resins and plastics in synthetic softeners. Not mentioned is the use of colophonium resins and/or oils of vegetable origin.

Thus, the documents known so far-do not indicate resin preparations consisting of colophonium and/or colophonium derivatives and oils of vegetable origin in which the resins serve as the components determining the function, and in particular they do not indicate the advantageous use thereof in dispersion adhesives.

Therefore, it is an object of the present invention to create dispersion adhesives of the class mentioned above which do not have the described disadvantages and which may advantageously be used as low emission dispersion adhesives in particular as coverings for floor, wall and ceilings in the field of building.

According to the invention, this object is achieved by dispersion adhesives containing a resin preparation consisting of a mixture of:

a. 20 to 90% by wt. of resins having a melting point or softening range, respectively, between 20 and 130° C. in the form of natural and/or modified colophonium resins and/or colophonium resin esters and/or resin acid mixtures obtained from colophonium and/or the esters thereof and b. 80 to 10% by wt. of oils which are liquid at room temperature and serve as a carrier medium for the resins listed under a. consisting of natural mixtures of glycerol esters of saturated and/or unsaturated and/or hydroxyl group-containing C14–C22 fatty acids of vegetable origin, which are optionally refined or purified, and/or esters of mixtures of saturated and/or unsaturated C14–C22 fatty acids of vegetable origin with monovalent C1 to C12 alcohols which are optionally refined or purified.

Preferably the dispersion adhesives of the invention consist of a. 5–60% by wt. of the resin preparation disclosed above and b. 40–95% by wt. of aequous polymer dispersions or emulsions, respectively, of a type known per se, which optionally contain additional dispersing agents, anti foaming agents, preservatives, thickeners, regulating agents, additives, and fillers also of a type known per se.

Preferably, the resin preparation is a homogenous mixture.

According to the invention resin preparations have been found, which comply within the quantitative ranges of the invention with the requirements stated to a high degree. Said resin preparations are homogenously liquid and may be adjusted to a viscosity required for handling within a temperature range of 25 to 95° C. The resin preparations of the invention may very well be incorporated into the dispersion preparations and, surprisingly, the resulting initial tackiness of the dispersion adhesives made thereof may be adjusted very variably. There is no negative effect on the coverings glued by said dispersion adhesives.

The liquid carrier media used according to the present invention do not exhibit a measurable steam pressure, so that the VOC emissions of the resin preparations are substantially limited to the self-emissions of the resins used. The dispersion adhesives made thereof show noticeably lower VOC emissions in the initial phase as well as in the long term phase in comparison to adhesives prepared according to known procedures. They higly comply with the requirements of an integrated working, environmental and consumer protection. Due to their enhanced proportion of again growing biodegradeable components said adhesives are environmentally compatible to a high degree.

Using the resin preparations according to the invention dispersion adhesives may be prepared, which may actually be constructed of plastic, synthetic rubber, natural rubber or synthetic resin dispersions, i.e. polymer dispersions, dispersing agents, anti foaming agents, thickening agents, preservatives and regulating agents, other additives and mineralic filling agents, in a manner known per se. The dispersion adhesives prepared according to the procedure of the invention may be very well adjusted in their initial tackiness and show very good overall functionality. They are useful as adhesives for planar structures in particular as adhesives for floor, wall and ceiling coverings in interiors.

The discovered procedure for the production of the resin preparations comprises dissolving tackifying resins of a type known per se optionally by addition of heat in oils of vegetable origin and of a type known per se, wherein the dissolving is performed in specific particularly effective quantitive ratios depending on the type of resin and oil.

The oils which are useful according to the invention serve as a liquid carrier medium for the resins instead of the highly and not volatile organic solvents which have been used to date according to the prior art. The oils lack a defined boiling point or have a boiling point of more than 250° C. and therefore, according to EU definition (Official Gazette of the European Communities DE, dated Jan. 6, 1996, No. L4/13, annex 1, point 3), are themselves not considered as volatile organic compounds (VOC). In their commercial technically purified or refined form they do not contain significant amounts of other VOC which might lead to relevant emissions in practice.

Particularly useful for this purpose are oils of vegetable origin which in their natural form are glycerol esters of mixtures of saturated, unsaturated, sometimes also hydroxyl group-containing C14 to C22 fatty acids. Oils of this type are for example flax-seed oil, rape-seed oil, castor oil, beet root oil, soya oil, sunflower oil, and the like.

Also suitable are oils obtained by esterification of mixtures of unsaturated and saturated C14 to C22 fatty acids of vegetable origin with monovalent alcohols, e.g. with monovalent C1 to C12 alcohols. Oils of this type are for example the methyl, butyl or 2-ethylhexyl esters of tall oil fatty acids.

Also suitable are mixtures of these oils.

If unsaturated oils, such as flax-seed oil, are used, drying enhancers, so-called siccatives, may be added to the resin preparation where they contribute to a subsequent oxidative setting and thus to enhanced adhesive cohesion.

If hydroxyl group-containing oils, such as castor oil, are used, cross-linking agents such as specific polyisocyaates reacting with hydroxyl groups may be added to the finished adhesive prior to processing, which contribute to subsequent cross-linking and therefore also to enhanced adhesive cohesion.

In the following, the above described esters of fatty acid mixtures of vegetable origin, which may be used according to the invention, are for convenience simply referred to as oils.

Preferably, natural mixtures of vegetable origin of glycerol esters of saturated, unsaturated, e.g. also hydroxyl group-containing C14 to C22 fatty acids are used as a liquid carrier for the resin preparation according to b.

More preferably for the resin preparation according to b. vegetable oils such as flax-seed oil, rape-seed oil, castor oil, beet root oil, soya oil or sunflower oil optionally in purified or refined form as well as mixtures thereof are used as a liquid carrier.

Most preferably for the resin preparation according to b. vegetable oils such as castor oil or soya oil optionally in purified or refined form as well as mixtures thereof are used as a liquid carrier.

Preferably for the resin preparation according to b. also esters of mixtures or saturated and unsaturated C14 to C22 fatty acids of vegetable origin with monovalent C1 to C12 alcohols are used as a liquid carrier.

Preferably for the resin preparation according to b. esters of mixtures of tall oil fatty acids with monovalent C1 to C8 alcohols are used as a liquid carrier.

More preferably for the resin preparation according to b. the methyl, butyl or 2-ethylhexyl esters of tall oil fatty acid mixtures as well as mixtures thereof are used as a liquid carrier.

Most preferably for the resin preparation according to b. the butyl ester of tall oil fatty acid mixtures is used as liquid carrier.

Preferably for the resin preparation according to b. also mixtures of the oils described are used.

The oils which may be used according to the invention for the resin preparation according to b. are of vegetable origin and therefore may still contain natural contaminations with resin acids, partly oxidized resin acids, so-called neutral substances, and other non-saponifiable components.

Useful as tackifying resins for the resin preparations of the invention and the use thereof are resins of vegetable origin known per se which are complex mixtures of so-called resin acids. Those natural resin acid mixtures essentially consist of specific unsaturated carboxylic acids having the molecular formula $C_{20}H_{30}O_2$, such as abietic acid, neoabietic acid, levopimaric acid, pimaric acid, isopimaric acid, palustric acid and the like optionally containing minor components such as hydrogenated, dehydrogenated or oxidized resin acids as well as so-called neutral substances, such as fatty acid esters, terpenes, terpene alcohols and hydrocarbons.

Resins of this type are mainly derived from tree resins and, in common language, are referred to as balsamic resin, root resin or tall resin as well as the generic term colophonium.

Relevant according to the invention, however, is not the interpretable trivial name of these resins but their fundamentally similar chemical composition and their vegetable origin.

Further useful as tackifying resins for the resin preparations of the invention and the use thereof are chemically altered or modified colophonium resins having a melting point between 20 and 130° C. Those resins particularly are colophonium derivatives obtained by dimerization, polymerization, disproportionation or hydrogenation and/or by homogenous or mixed esterification with monovalent, bivalent or polyvalent alcohols such as methanol, ethylene glycol, diethylene glycol, triethylene glycol, glycerol, pentaerythritol and the like as well as by esterification of resin acid derivatives such as esters of hydroabietic alcohol with mono or polyvalent alcohols.

Preferably, colophonium resins are used for the resin preparation according to a.

Preferably, dimerized, polymerized, disproportionated and/or hydrogenated colophonium resins are used for the resin preparation according to a.

Preferably esters of colophonium resins with monovalent or polyvalent alcohols are used for the resin preparation according to a.

Preferably methyl, ethylene glycol, diethylene glycol, triethylene glycol, glycerol or pentaerythritol esters of colophonium resins as well as mixtures thereof are used for the resin preparation according to a.

Preferably triethylenglycol or glycerol esters of colophonium resins as well as mixtures thereof are used for the resin preparation according to a.

Preferably paraformaldehyde modified colophonium resins are used for the resin preparation according to a.

Preferably resins having a melting point or softening range, respectively, from 20 to 130° C. are used for the resin preparation according to a.

Preferably resins having a melting point or softening range, respectively, from 30 to 124° C. are used for the resin preparation according to a.

Preferably resins having a melting point or softening range, respectively, from 40 to 118° C. are used for the resin preparation according to a.

Preferably resins having a melting point or softening range, respectively, from 50 to 112° C. are used for the resin preparation according to a.

Preferably resins having a melting point or softening range, respectively, from 60 to 106° C. are used for the resin preparation according to a.

Preferably resins having a melting point or softening range, respectively, from 70 to 100° C. are used for the resin preparation according to a.

In the following, the described colophonium resins and derivatives thereof which may be used according to the invention are shortly referred to as resins for the purpose of convenience. Also, mixtures of these resins are suitable.

The resins used according to the invention for the resin preparation under a. are partly of vegetable origin and may therefore contain natural contaminations of fatty acids, partially oxidized resin acids, so-called neutral substances, and other non-saponifiable components.

Additionally, synthetic resins having a melting point or melting range, respectively, between 20 and 130° C., such as coumarone resins, coumarone-indene resins, phenolic resins, olefin/ester copolymer resins, ethylene vinyl acetate copolymer resins, olefin/styrene copolymer resins, polydiene resins, cyclopentadiene resins and rubbers and the like as well as mixtures thereof may be added to the resins which can be used according to the invention. The present invention is not affected by such an admixture, if the synthetic resins are present in a minor amount as compared to the resins of the invention.

The resin preparations of the present invention may be used for the preparation of resin-based polymer dispersions and resin-based dispersion adhesives.

Polymer dispersions of a type known per se are suitable therefor, said polymer dispersions exhibiting a sufficient shear stability at temperatures of 20–95° C., such as aequous dispersions of homopolymers, copolymers and block copolymers based on acrylic esters, methacrylic esters, acrylic acid, methacrylic acid, acrylonitrile, vinyl acetate, vinyl chloride, ethylene, styrene, butadiene and the like as well as mixtures of such polymer dispersions. This list is only given by way of example; the fundamental applicability of other polymer dispersions may be investigated by simple laboratory experimentation.

The production of the resin preparations according to the invention is managed, such that the oil is placed in a heated mixing container and is heated to a temperature in the range of 20–130° C., preferably 70 to 90° C. The resins are added in portions under agitation and admixed. Over a period of about 30 minutes to several hours the resulting preparation may then be heated up to about 100° C. while agitating to optionally separate volatile ingredients, such as terpenes, from the colophonium resins by a cooler, if desired. The incorporation of the resins may also be carried out at room temperatur depending on their solubility, in the case of which appropriate longer agitating periods are to be expected.

Preferably the liquid carrier medium is placed in a heated mixing container and heated to 30 to 120° C., followed by adding the resins under agitation, and whilst maintaining the temperatur in the range of 30 to 120° C. the agitation is continued for a period sufficiently long to form a homogenous mixture.

Preferably, the liquid carrier medium is placed in a heated mixing container and heated to 40 to 110° C., followed by adding the resins under agitation, and whilst maintaining the temperatur in the range of 40 to 110° C. the agitation is continued for a period sufficiently long to form a homogenous mixture.

Preferably the liquid carrier medium is placed in a heated mixing container and heated to 50 to 100° C., followed by adding the resins under agitation, and whilst maintaining the temperatur in the range of 50 to 100° C. the agitation is continued for a period sufficiently long to form a homogenous mixture.

Preferably the liquid carrier medium is placed in a heated mixing container and heated to 60 to 95° C., followed by adding the resins under agitation, and whilst maintaining the temperatur in the range of 60 to 95° C. the agitation is continued for a period sufficiently long to form a homogenous mixture.

Preferably the liquid carrier medium is placed in a heated mixing container and heated to 70 to 90° C., followed by adding the resins under agitation, and whilst maintaining the temperatur in the range of 70 to 90° C. the agitation is continued for a period sufficiently long to form a homogenous mixture.

Preferably the resulting mixed homogenous resin preparation is heated under agitation to 90 to 100° C. and maintained at this temperature for 30 minutes to 5 hours, and optionally the volatile components are removed in a suitable manner.

Preferably, the resulting mixed homogenous resin preparation is heated or cooled, respectively, under agitation to 30–90° C., more preferably 60–90° C., most preferably 70–90° C., followed by immediate processing or storage at this temperature range.

The final liquid resin preparation may directly be admixed into the polymer dispersion or mixture of other adhesive components, respectively, being placed in another mixer, or it may be cooled and reheated prior to dispersion, or it may be stored at a temperature, at which said resin preparation remains in a liquid mobile state.

The incorporation of the resin preparations according to the invention into dispersion adhesives may be carried out according to different manners known to the skilled artisan, as it has been put into practice hereotfore with known resin preparations. In the most simple case, the polymer dispersion, being optionally provided with dispersing and anti foaming agents as well as with other additives and fillers, is charged, into which the liquid resin preparation is admixed in portions. Both, the charged dispersion preparation and the resin preparation may be present at a temperature range between 20 and 95° C. during dispersing. The optimal incorporation temperatures are dependent on the temperature stability of the dispersion preparation as well as on the viscosity of the resin preparation. The period of dispersing is sufficiently long to form a homogenous adhesive preparation. This operation method is obvious to the persons skilled in the art of dispersion adhesives.

Preferably the dispersion preparation being yet free of resin is placed into a heated mixing container, followed by heating up to 20 to 95° C. Thereafter, the liquid resin preparation having a temperature of 30 to 90° C. is added under agitation and dispersed sufficiently long to form a homogenous adhesive preparation.

Preferably the dispersion adhesive preparation is cooled to room temperature following dispersing of the resin preparation.

It has been shown, that only resin/oil combinations in specific proportional amounts, both in the resin preparation itself as well as in the amount, which is added to the polymer dispersion, may lead to a solution of the object described further above. Again, these quantitive ratios may depend on the type of the resins and oils.

According to the teachings of this invention, the resin preparations, in which the resin:oil ratio is as high as possible and a viscosity is achieved within a temperature range of 20 to 90° C., which can just be handled, pumped and mixed by process engineering, result in a higher initial tackiness and cohesion if used in the same proportional amount in the dispersion adhesives made thereof as compared to resin preparations having lower resin:oil ratios. Lower resin:oil ratios result in resin preparations having lower viscosity and provide softer dispersion adhesives having lower initial tackiness and cohesion, but longer open time. Fundamentally suitable are resin:oil ratios in the range of 90:10 to 20:80 parts by wt. Resin:oil ratios ranging from 80:20 to 60:40 parts by wt. are preferred. In each case the most suitable resin:oil ratios depend on the type of the resins and oils, on the desired viscosity of the resin preparation and on the desired properties of the dispersion adhesive. They simply may be determined by experimentation.

According to the teachings of the invention the initial tackiness and cohesion which can be achieved in a dispersion adhesive increase at an identical resin:oil ratio as the amount of incorporated resin preparation increases, provided that the self tackiness and the self cohesion of said resin preparations are not higher than that of the adhesive preparation to which no resin preparation was added. According to the invention proportional amounts of the resin preparation present in the dispersion adhesive from 5–60% are suitable, wherein proportional amounts from 20 to 30% are preferred.

Above all, high initial tackiness and cohesion of the dispersion adhesives prepared according to the present invention may be achieved by using resin preparations made of resins which are themselves solid and exhibit a melting point a or a softening range, respectively, between 50 and 130° C. Resin preparations from resins, which are themselves liquid at room temperature or which exhibit a melting point or softening range, respectively, between 25–50° C., result in softer dispersion adhesives having a lower initial tackiness and lower cohesion. According to the invention, by appropriately selecting the resins or by mixing of the resins having different melting points or softening ranges, respectively, it is possible to produce resin preparations, by which the tackiness and solidity properties of the dispersion adhesives made thereof may specifically be adjusted.

In summary, according to the teachings of the present invention it is possible to prepare liquid resin preparations, which may be well incorporated into dispersion adhesives, and allow a specific adjustment of the adhesive properties of said dipersion adhesives and do not result in VOC emissions additionally caused by the liquid carrier contained in the resin preparation. Therefore, the present invention describes a novel way, which avoids the disadvantages of the use of liquid carriers in resin preparations and which simultaneously enables the desired adjustment of the adhesive properties of dispersion adhesives by means of resin addition. Further characteristics, objects and advantages of the invention result from the following examples.

EXAMPLES

To further illustrate the method of the present invention resin preparations are prepared from the following resins and oils:

Resins:
R1=colophonium balsamic resin WW/X
R2=colophonium pentaerithritol ester trade name: dertoline P2
R3=colophonium triethylene glycol ester trade name: tragum 2333DI
R4=colophonium, polymerized trade name: tragum PK 101
R5=colophonium glycerol ester trade name: dertoline G2L
R6=colophonium, paraformaldehyde modified trade name: tragum SP
R7=colophonium disproportionated trade name: resin 731 P
R8=colophonium, hydrogenated trade name: staybelite resin Oils:
O1=soya oil
O2=castor oil
O3=rape-seed oil
O4=flax-seed oil
O5=beet root oil
O6=sunflower oil
O7=tall oil fatty acid butyl ester Production of the resin preparations The vegetable oil is charged and heated to 80° C. The optionally crushed resin is added in portions over 1 h under agitation and maintaining the temperature at 80° C. Subsequently the agitation is continued for a further hour at 80° C. and eventually the finished resin preparation is evaluated and incorporated into an adhesive preparation.

Maximum range of resin concentrations in the resin preparation:

Since the adhesive force enhancing effect of the resins is in the foreground and the oil only operates as a liquifying auxiliary component, resin preparations RP having a maximum amount of resin and a concurrent operable consistency are produced from different resins and oils. A honey-like viscosity which can just be sufficiently pumped and mixed at 80° C. results from the following resin:oil ratios.

TABLE 1

| RP | resin/oil | RP | resin/oil | RP | resin/oil | RP | resin/oil |
|---|---|---|---|---|---|---|---|
| R1O1 | 80/20 | R2O1 | inhomogenous | R3O1 | 80/20 | R4O1 | inhomogenous |
| R1O2 | 75/25 | R2O2 | 70130 | R3O2 | 80/20 | R4O2 | 65/35 |
| R1O3 | inhomogenous | R2O3 | inhomogenous | R3O3 | 80/20 | R4O3 | inhomogenous |
| R1O4 | 80/20 | R2O4 | inhomogenous | R3O4 | 80/20 | R4O4 | 65/35 |
| R1O5 | 80/20 | R2O5 | inhomogenous | R3O5 | 80/20 | R4O5 | 70/30 |
| R1O6 | 80/20 | R2O6 | inhomogenous | R3O6 | 80/20 | R4O6 | inhomogenous |
| R1O7 | 80/20 | R2O7 | 80/20 | R3O7 | 80/20 | R4O7 | 80/20 |
| R5O1 | 80/20 | R6O1 | 80/20 | R7O1 | inhomogenous | R8O1 | 80/20 |
| R5O2 | 70/30 | R6O2 | 70/30 | R7O2 | inhomogenous | R8O2 | 70/30 |
| R5O3 | 65/35 | R6O3 | 65/35 | R7O3 | inhomogenous | R8O3 | inhomogenous |
| R5O4 | 80/20 | R6O4 | 80/20 | R7O4 | inhomogenous | R8O4 | inhomogenous |
| R5O5 | 80/20 | R6O5 | 80/20 | R7O5 | inhomogenous | R8O5 | inhomogenous |
| R5O6 | 80/20 | R6O6 | 80/20 | R7O6 | inhomogenous | R8O6 | inhomogenous |
| R5O7 | 80/20 | R6O7 | 80/20 | R7O7 | inhomogenous | R8O7 | inhomogenous |

The resin preparations RP produced like this are referred to as R1O1/8020, R2O2/7525 and analogously so on depending on the type of the resins and oils and on the proportional amounts thereof in percent by weight.

Furthermore, from individual resin-oil combinations there are produced serial concentrations with decreasing amounts of resin, as is illustrated in table 2 by way of example with respect to R4O7, R5O5 and R6O4:

TABLE 2

| RP | resin/oil | RP | resin/oil | RP | resin/oil |
|---|---|---|---|---|---|
| R4O7 | 80/20 | R5O5 | 80/20 | R6O4 | 80/20 |
| R4O7 | 60/40 | R5O5 | 60/40 | R6O4 | 60/40 |
| R4O7 | 40/60 | R5O5 | 40/60 | R6O4 | 40/60 |
| R4O7 | 20/80 | R5O5 | 20/80 | R6O4 | 20/80 |

To further illustrate the behaviour of the resin preparations of the present invention in dispersion adhesives following basic adhesive prescriptions are given with respect to table 3. To balance different amounts of resin preparation added as well as to adjust an adhesive consistency which may be spread in a similar manner the proportional amounts of dolomite powder and water are modified (the quantities are given in percent by weight).

TABLE 3

| component | trade name | K40 | K30 | K20 | K10 | K05 |
|---|---|---|---|---|---|---|
| polymer dispersion 1 | vinnapas EAF 60 | 20.0 | 20.0 | 20.0 | 20.0 | 20.0 |
| polymer dispersion 2 | acronal A 323 | 20.0 | 20.0 | 20.0 | 20.0 | 20.0 |
| dispersant | dispex N 40 | 0.3 | 0.3 | 0.3 | 0.3 | 0.3 |
| preservative | hydorol MV | 0.1 | 0.1 | 0.1 | 0.1 | 0.1 |
| anti foaming agent | byk 033 | 0.1 | 0.1 | 0.1 | 0.1 | 0.1 |
| dolomite powder | heladol 1090 | 18.0 | 28.0 | 38.0 | 43.0 | 47.0 |
| water | | 1.5 | 1.5 | 1.5 | 6.5 | 7.5 |
| resin preparation | | 40.0 | 30.0 | 20.0 | 10.0 | 5.0 |

For the preparation of the adhesives all components except the resin preparation are homogenously premixed. The premixture thus obtained is charged at room temperature, and the liquid resin preparation having a temperature of 80° C. is rapidly dispersed therein while vigorously agitating until a homogenous adhesive preparation is obtained.

Two commercial dispersion adhesives having different initial tackiness for textile floor coverings, referred to as VK1 and VK2, were compared to the adhesives obtained in the above manner:

Evaluation of the adhesives

The initial adhesive force of the adhesives is determined. For this purpose the adhesive is applied to a chipboard by means of an indentation B1. Following a 10 minutes aeration period three strips sized 5×25 cm of a needled web covering (Girmes brand, quality 86705, dessin 2533) are inserted into the adhesive bed and tightened by use of a 2 kg manual roller. The inserted covering strips are weighted over the complete area with a 1 kg weight. After 25, 40 and 55 minutes, respectively, each of the strips is withdrawn in a perpendicular direction by means of a 50 N spring balance, and the force indicated is recorded. The results are summarized in table 4 (withdrawing force in N).

TABLE 4

| No. | adhesive | 25 min | 40 min | 55 min |
|---|---|---|---|---|
| | VK1 | 1 | 6 | 15 |
| | VK2 | 4 | 26 | 45 |
| 1. | K20/R1O1/8020 | 2 | 15 | 28 |
| 2. | K20/R1O2/7525 | 3 | 23 | 33 |
| 3. | K20/R1O4/8020 | 2 | 12 | 28 |
| 4. | K20/R1O5/8020 | 2 | 14 | 25 |
| 5. | K20/R1O6/8020 | 2 | 8 | 18 |
| 6. | K20/R1O7/8020 | 2 | 8 | 19 |
| 7. | K20/R2O2/7030 | 1 | 6 | 18 |
| 8. | K20/R2O7/8020 | 1 | 6 | 22 |
| 9. | K20/R3O1/8020 | 0 | 2 | 8 |
| 10. | K20/R3O2/8020 | 0 | 3 | 8 |
| 11. | K20/R3O3/8020 | 0 | 2 | 6 |
| 12. | K20/R3O4/8020 | 0 | 2 | 8 |
| 13. | K20/R3O5/8020 | 0 | 2 | 7 |
| 14. | K20/R3O6/8020 | 0 | 1 | 3 |
| 15. | K20/R3O7/8020 | 0 | 2 | 3 |
| 16. | K20/R4O2/6535 | 3 | 18 | 32 |
| 17. | K20/R4O4/6535 | 2 | 9 | 20 |
| 18. | K20/R4O5/7030 | 1 | 7 | 18 |
| 19. | K20/R4O7/8020 | 3 | 14 | 30 |
| 20. | K20/R4O7/6040 | 2 | 6 | 15 |
| 21. | K20/R4O7/4060 | 1 | 3 | 6 |
| 22. | K20/R4O7/2080 | 1 | 2 | 4 |
| 23. | K20/R5O1/8020 | 1 | 6 | 20 |
| 24. | K20/R5O2/7030 | 1 | 3 | 8 |
| 25. | K20/R5O3/6535 | 0 | 1 | 3 |
| 26. | K20/R5O4/8020 | 1 | 9 | 24 |
| 27. | K20/R5O5/8020 | 5 | 18 | 32 |
| 28. | K20/R5O5/6040 | 0 | 1 | 4 |
| 29. | K20/R5O5/4060 | 0 | 1 | 3 |
| 30. | K20/R5O5/2080 | 0 | 1 | 2 |
| 31. | K20/R5O6/8020 | 3 | 15 | 28 |
| 32. | K20/R5O7/8020 | 2 | 9 | 24 |
| 33. | K10/R6O1/8020 | 8 | 26 | 43 |
| 34. | K20/R6O2/7525 | 4 | 24 | 36 |
| 35. | K20/R6O3/6535 | 1 | 9 | 16 |
| 36. | K05/R6O4/8020 | 0 | 1 | 3 |
| 37. | K10/R6O4/8020 | 0 | 2 | 10 |
| 38. | K20/R6O4/8020 | 9 | 30 | 46 |
| 39.c | K30/R6O4/8020 | 18 | 33 | 44 |
| 40. | K40/R6O4/8020 | 20 | 36 | 45 |
| 41. | K20/R6O4/6040 | 2 | 10 | 19 |
| 42. | K20/R6O4/4060 | 1 | 5 | 10 |
| 43. | K20/R6O4/2080 | 1 | 2 | 5 |
| 44. | K20/R6O5/8020 | 7 | 24 | 42 |
| 45. | K20/R6O6/8020 | 12 | 34 | 40 |
| 46. | K20/R6O7/8020 | 8 | 31 | 40 |
| 47. | K20/R8O1/8020 | 8 | 26 | 30 |
| 48. | K20/R8O2/7030 | 1 | 6 | 20 |

The results show, that under otherwise identical conditions the type of oil does not have a too great influence on some of the resin types (no. 1 to 5, no. 7 to 12), but has an influence on other types (no. 13 and 14, no. 19, 20 and 24).

The results of nos. 7 to 12 show, that a resin, which itself is liquid at room temperature and referred to as soft resin, tends to result in very low values, but may possibly be used e.g. as a mixing component with other resins.

The results show, that the values decrease as the resin portion of the resin preparation decreases, or, that fundamentally higher values are achieved with resin preparations, in which a high resin portion is present (no. 20–23, no. 30, 33–35), respectively.

The results of nos. 28–32 show, that using the same resin preparation the 25 min values increase as the proportion of the resin preparation in the adhesive preparation increases. The 40- and 55 min values do not vary significantly beyond a 20% proportion of resin preparation.

In total, the results show, that by using the resin preparations according to the invention the dispersion adhesives may specifically be affected in a wide range with respect to the initial tackiness thereof. In most of the cases it is possible to reach the initial tackiness of commercial adhesives, but frequently the initial tackiness of adhesives according to the invention is even better. Using mixed resins the initial tackiness as well as other adhesive properties, such as open time, shear resistance, final stability and heat resistance, may specifically be adjusted according to the teachings of the present invention by selection of the appropriate resin preparations, and optionally by mixtures of said resin preparations and the their production, respectively.

Moreover, the technical properties of the dispersion adhesives may further be affected by a selection of polymer dispersions and additives, the selection being obvious to the skilled artisan.

VOC emission behaviour

To compare the VOC emission behaviours, the resin preparations RP1 and RP2 were produced according to known prior art by using the liquid carrier media, BDGA, BDG and PhG, which are medium to not volatile, as well as the resin preparations RP3 and RP4 by using soya oil and castor oil (table 5):

TABLE 5

|  | RP1 % | RP2 % | RP3 % | RP4 % |
| --- | --- | --- | --- | --- |
| 2-(2-butoxy ethoxy)-ethyl acetate (BDGA) | 15 | — | — | — |
| 2-(2-butoxy ethoxy)-ethanol (BDG) | 10 | 10 | — | — |
| 2-phenoxy ethanol (PhG) | — | 15 | — | — |
| soya oil | — | — | 25 | — |
| castor oil | — | — | — | 35 |
| colophonium resin | 45 | 45 | 45 | — |
| colophonium resin ester | 30 | 30 | 30 | 65 |

Using these resin preparations dispersion adhesives were prepared according to the methods already described above, following the prescription illustrated in table 6 (the amounts are given in percent by weight):

TABLE 6

| component | EK1 | EK2 | EK3 | EK4 |
| --- | --- | --- | --- | --- |
| PV Ac-E-acrylate dispersion | 53.0 | — | 20.0 | 20.0 |
| PV Ac-acrylate dispersion | — | 20.0 | 20.0 | 20.0 |
| dispersant | 0.2 | 0.2 | 0.2 | 0.2 |
| preservative | 0.1 | 0.1 | 0.1 | 0.1 |
| anti foaming agent | 0.2 | 0.2 | 0.2 | 0.2 |
| thickener | 0.3 | 0.3 | 0.1 | 0.1 |
| pH adjusting agent | 0.2 | 0.2 | 0.2 | 0.2 |
| stone powder filler | 25.0 | 50.0 | 38.2 | 33.2 |
| water | 6.0 | 9.0 | 1.0 | 1.0 |
| resin preparation RP1 | 15.0 | — | — | — |
| resin preparation RP2 | — | 20.0 | — | — |
| resin preparation RP3 | — | — | 20.0 | — |
| resin preparation RP4 | — | — | — | 25.0 |

Apart from the variation parameters to be illustrated the prescriptions are not identically composed, since at the same time it was intended to illustrate some differences in the effectiveness of adhesives related to practice. Thus, the adhesive EK1 represents an adhesive having a high proportion of polymer and a relatively low resin proportion (polymer: resin approx. 3:1), adhesive EK2 represents a typical highly filled wet adhesive having a lower proportion of polymer and higher resin proportion (polymer:resin approx. 1:1). The adhesives EK3 and EK4 prepared according to the invention are wet adhesives having a medium polymer:resin ratio of 1.5 or 2:1, respectively.

Emission test methodology:

The preparation of the specimens and the measurement of the emission is carried out under the same defined conditions. As a specimen an adhesive layer is used, which has been prestored for 14 days at normal atmosphere 23/50 on an inert glass carrier. The test is carried out in an emission testing chamber having a volume of 0.18 m$^3$. The chamber is purged with highly purified air. The purge gas is carried through activated carbon to identify the individual substances emitted from the adhesive layer. The VOC adsorbed on the activated carbon are desorbed with appropriate solvents and identified by means of GC/MS coupling. In a further analysis operation the sum of the signals determined by means of GC/FID is quantified as a toluene equivalent according to TRGS 404, expressed as [$\mu g/m^2h$]. The result are shown in table 7:

TABLE 7

| adhesive | main emission | emission factor after 14 d [$\mu g/(m^2h)$] |
| --- | --- | --- |
| EK1 | BDGA/BDG | >2000 |
| EK2 | PhG | >1000 |
| EK3 | diverse traces | <300 |
| EK4 | diverse traces | <300 |

In contrast to the known prior art, the result shows, that the resin preparations according to the present invention ensure the preparation of very low emission dispersion adhesives. According to the opinion of the skilled artisans at the present time, emission factors of building materials below 300 $\mu g/m^2h$ are considered to be highly safely. Thus, by means of the process according to the invention adhesives may pe produced, showing an emission factor lower than said value, while adhesives prepared according to the prior art exhibit significantly higher values.

In contrast to EK1 and EK2, the adhesives EK3 and EK4 prepared according to the invention show, that the overall emissions are significantly decreased immediately even if a comparable amount of the resin preparation is used and that those emissions eventually are merely caused by the various volatile trace components of the resins (terpenes) and polymer dispersions (monomers) used. If suitable low terpene (deodorized) resins and low monomer dispersions are chosen the emission factor according to the process of the invention may therefore be even more decreased to ranges <200 $\mu g/m^2h$.

In contrast, in the case of the two adhesives EK1 and EK2 substantial VOC emissions are additionally caused by the volatile carrier substances used in the production of the resin preparation.

In summary, there have been developed resin preparations according to the invention which 1. show a liquid consistency required for inclusion into dispersion adhesives
2. allow for direct adjustment of specific adhesive properties of dispersion adhesives, e.g. the initial tackiness
3. cause no or only insignificant VOC emissions brought about by the liquid carrier medium of the resin preparation
4. may be considered as having a higher environmental copmpatibility because of their vegetable origin.

Preferred embodiments of the invention are:

Dispersion adhesives, characterized in that said adhesives contain 8 to 55 percent by weight of the resin preparation.

Dispersion adhesives, characterized in that said adhesives contain 10 to 50 percent by weight of the resin preparation.

Dispersion adhesives, characterized in that said adhesives contain 12 to 45 percent by weight of the resin preparation.

Dispersion adhesives, characterized in that said adhesives contain 14 to 40 percent by weight of the resin preparation.

Dispersion adhesives, characterized in that said adhesives contain 16 to 36 percent by weight of the resin preparation.

Dispersion adhesives, characterized in that said adhesives contain 18 to 33 percent by weight of the resin preparation.

Dispersion adhesives, characterized in that said adhesives contain 20 to 30 percent by weight of the resin preparation.

Dispersion adhesives, characterized in that said adhesives contain resin preparations consisting of 30–88 percent by weight of resins and 70 to 12 percent by weight of liquid oils.

Dispersion adhesives, characterized in that said adhesives contain resin preparations consisting of 40–86 percent by weight of resins and 60 to 14 percent by weight of liquid oils.

Dispersion adhesives, characterized in that said adhesives contain resin preparations consisting of 50–84 percent by weight of resins and 50 to 16 percent by weight of liquid oils.

Dispersion adhesives, characterized in that said adhesives contain resin preparations consisting of 60–82 percent by weight of resins and 40 to 18 percent by weight of liquid oils.

Dispersion adhesives, characterized in that said adhesives contain resin preparations consisting of 65–80 percent by weight of resins and 35 to 20 percent by weight of liquid oils.

Dispersion adhesives, characterized in that as resins are used colophonium resins in the form of balsamic resins, root resins, and/or tall resins.

Dispersion adhesives, characterized in that as resins are used colophonium resins in the form of their hydrogenated, dehydrogenated, disproportionated and/or polymerized derivatives.

Dispersion adhesives, characterized in that as resins are used esters of colophonium resins and/or of their hydrogenated, dehydrogenated, disproportionated and/or polymerized derivatives with mono or polyvalent alcohols.

Dispersion adhesives, characterized in that as resins are used the methyl, butyl, ethylene glycol, diethylene glycol, triethylene glycol, glycerol and/or pentaerithritol esters of colophonium resins and/or of their hydrogenated, dehydrogenated, disproportionated and/or polymerized derivatives.

Dispersion adhesives, characterized in that as resins are used colophonium resins modified by paraformaldehyde and/or the hydrogenated, dehydrogenated, disproportionated and/or polymerized derivatives of colophonium resins modified by paraformaldehyde.

Dispersion adhesives, characterized in that as resins are used mixtures of resin acids consisting of essentially unsaturated carboxylic acids having the molecular formula $C_{20}H_{30}O_2$ such as abietic acid, neoabietic acid, levopimaric acid, pimaric acid, isopimaric acid, palustric acid and/or the hydrogenated, dehydrogenated, or oxidized, disproportionated and/or polymerized derivatives thereof.

Dispersion adhesives, characterized in that as resins are used esters of mixtures of resin acids consisting of essentially unsaturated carboxylic acids having the molecular formula $C_{20}H_{30}O_2$ such as abietic acid, neoabietic acid, levopimaric acid, pimaric acid, isopimaric acid, palustric acid and/or the hydrogenated, dehydrogenated, or oxidized, disproportionated and/or polymerized derivatives thereof with mono or polyvalent alcohols.

Dispersion adhesives, characterized in that as resins are used mixtures of resin acids consisting of essentially unsaturated carboxylic acids having the molecular formula $C_{20}H_{30}O_2$ such as abietic acid, neoabietic acid, levopimaric acid, pimaric acid, isopimaric acid, palustric acid modified by paraformaldehyde and/or the hydrogenated, dehydrogenated, or oxidized, disproportionated and/or polymerized resin acid derivatives modified by paraformaldehyde.

Dispersion adhesives, characterized in that as resins are used resins which are liquid at room temperature.

Dispersion adhesives, characterized in that as resins are used mixtures of the described resins.

Dispersion adhesives, characterized in that as carrier medium oils are used natural mixtures of glycerol esters of essentially C14 to C22 fatty acids.

Dispersion adhesives, characterized in that as carrier medium oils are used natural and optionally refined or purified flax-seed oil, rape-seed oil, castor oil, beet-root oil, soya oil, sunflower oil or the mixtures thereof.

Dispersion adhesives, characterized in that as carrier medium oils are used natural and optionally refined or purified rape-seed oil, castor oil or soya oil or the mixtures thereof.

Dispersion adhesives, characterized in that as a carrier medium oil is used natural and optionally refined or purified rape-seed oil.

Dispersion adhesives, characterized in that as a carrier medium oil is used natural and optionally refined or purified castor oil.

Dispersion adhesives, characterized in that as a carrier medium oil is used natural and optionally refined or purified soya oil.

Dispersion adhesives, characterized in that as carrier medium oils are used esters of mixtures of saturated and unsaturated C14 to C22 fatty acids of vegetable origin with monovalent C1 to C12 alcohols.

Dispersion adhesives, characterized in that as carrier medium oils are used esters of tall oil fatty acid mixtures with monovalent C1 to C8 alcohols.

Dispersion adhesives, characterized in that as carrier medium oils are used the methyl, butyl or 2-ethylhexyl esters of tall oil fatty acid mixtures as well as mixtures thereof.

Dispersion adhesives, characterized in that as a carrier medium oil is used the butyl ester of tall oil fatty acid mixtures.

Dispersion adhesives, characterized in that as carrier medium oils are used mixtures of the oils described.

Process for the production of resin preparations characterized in that the liquid carrier medium is charged into a heated mixing container, followed by heating to 20 to 130° C., then the resins are admixed under agitation and the agitation is continued while maintaining the temperature at 20 to 130° C. until a homogenous mixture is obtained.

I claim:

1. A dispersion adhesive comprising a resin preparation consisting of a mixture of:
   (a) 20 to 90% by weight of resins having a melting point or a softening temperature range, respectively, of 20 to 130° C., said resins being one or more members selected from the group consisting of natural colophonium resins, modified colophonium resins, natural colophonium resin esters, modified colophonium resin esters, resin acid mixtures obtained from colophonium, and esters of resin acid mixtures obtained from colophonium; and
   (b) 80 to 10% by weight of a carrier medium comprising an oil that is liquid at room temperature, said oil consisting of natural mixtures of glycerol esters of a member selected from the group consisting of saturated $C_{14}$–$C_{22}$ fatty acids of vegetable origin, unsaturated $C_{14}$–$C_{22}$ fatty acids of vegetable origin, hydroxyl group-containing $C_{14}$–$C_{22}$ fatty acids of vegetable origin, esters of mixtures of saturated $C_{14}$–$C_{22}$ fatty acids of vegetable origin with monovalent $C_1$ to $C_{12}$ alcohols, and esters of mixtures of saturated $C_{14}$–$C_{22}$ fatty acids of vegetable origin with monovalent $C_1$ to $C_{12}$ alcohols.

2. A dispersion adhesive according to claim 1, in which said saturated $C_{14}$–$C_{22}$ fatty acids, unsaturated $C_{14}$–$C_{22}$ fatty acids, hydroxyl group-containing $C_{14}$–$C_{22}$ fatty acids, and esters of said oil of said carrier medium are refined or purified.

3. A dispersion adhesive according to claim 1, further comprising 40 to 95% by weight of liquid polymer dispersions or emulsions, the balance consisting of said resin preparation.

4. A dispersion adhesive according to claim 3, in which said liquid polymer dispersion or emulsions further contain one or more members selected from the group consisting of additional dispersants, anti-foaming agents, preservatives, thickeners, regulating agents, adhesives, and fillers.

5. A dispersion adhesive according to claim 1, in which said resin preparation constitutes 8 to 55% by weight of said adhesive.

6. A dispersion adhesive according to claim 1, in which said resin preparation constitutes 10 to 50% by weight of said adhesive.

7. A dispersion adhesive according to claim 1, in which said resin preparation constitutes 12 to 45% by weight of said adhesive.

8. A dispersion adhesive according to claim 1, in which said resin preparation constitutes 14 to 40% by weight of said adhesive.

9. A dispersion adhesive according to claim 1, in which said resin preparation constitutes 16 to 36% by weight of said adhesive.

10. A dispersion adhesive according to claim 1, in which said resin preparation constitutes 18 to 33% by weight of said adhesive.

11. A dispersion adhesive according to claim 1, in which said resin preparation constitutes 20 to 30% by weight of said adhesive.

12. A dispersion adhesive according to claim 1, in which said resin preparation comprises 30 to 88% by weight of said resins and 70 to 12% by weight of said oil.

13. A dispersion adhesive according to claim 1, in which said resin preparation comprises 40 to 86% by weight of said resins and 60 to 14% by weight of said oil.

14. A dispersion adhesive according to claim 1, in which said resin preparation comprises 50 to 84% by weight of said resins and 50 to 16% by weight of said oil.

15. A dispersion adhesive according to claim 1, in which said resin preparation comprises 60 to 82% by weight of said resins and 40 to 18% by weight of said oil.

16. A dispersion adhesive according to claim 1, in which said resin preparation comprises 65 to 80% by weight of said resins and 35 to 20% by weight of said oil.

17. A dispersion adhesive according to claim 1, in which said resins are one or more members selected from the group consisting of balsamic resins, root resins, tall resins, hydrogenated, dehydrogenated, disproportionated, or polymerized derivatives of balsamic, root or tall resins, esters of colophonium resins with mono or polyvalent alcohols, esters of hydrogenated, dehydrogenated, disproportionated, or polymerized derivatives of colophonium resins with mono or polyvalent alcohols, colophonium resins modified by paraformaldehyde, hydrogenated, dehydrogenated, disproportionated, or polymerized derivatives of colophonium resins modified by paraformaldehyde, mixtures of resin acids consisting of essentially unsaturated carboxylic acids having the molecular formula $C_{20}H_{30}O_2$, mixtures of resin acids consisting of hydrogenated, dehydrogenated, disproportionated, or polymerized derivatives of essentially unsaturated carboxylic acids having the molecular formula $C_{20}H_{30}O_2$, esters of mixtures of resin acids consisting of essentially unsaturated carboxylic acids having the molecular formula $C_{20}H_{30}O_2$ with mono or polyvalent alcohols, esters of mixtures of resin acids consisting of hydrogenated, dehydrogenated, disproportionated, or polymerized derivatives of essentially unsaturated carboxylic acids having the molecular formula $C_{20}H_{30}O_2$ with mono or polyvalent alcohols, mixtures of resin acids consisting of essentially unsaturated carboxylic acids having the molecular formula $C_{20}H_{30}O_2$ modified by paraformaldehyde, and mixtures of resin acids consisting of hydrogenated, dehydrogenated, disproportionated, or polymerized derivatives of essentially unsaturated carboxylic acids having the molecular formula $C_{20}H_{30}O_2$ modified by paraformaldehyde.

18. A dispersion adhesive according to claim 1, in which said resins have a melting point or softening temperature range of 30 to 124° C.

19. A dispersion adhesive according to claim 1, in which said resins have a melting point or softening temperature range of 40 to 118° C.

20. A dispersion adhesive according to claim 1, in which said resins have a melting point or softening temperature range of 50 to 112° C.

21. A dispersion adhesive according to claim 1, in which said resins have a melting point or softening temperature range of 60 to 106° C.

22. A dispersion adhesive according to claim 1, in which said resins have a melting point or softening temperature range of 70 to 100° C.

23. A dispersion adhesive according to claim 1, in which said resins are liquid at room temperature.

24. A dispersion adhesive according to claim 1, in which said carrier medium comprises an oil that is a natural mixture of glycerol esters of essentially $C_{14}$–$C_{22}$ fatty acids.

25. A dispersion adhesive according to claim 1, in which said carrier medium comprises an oil that is one or more members selected from the group consisting of natural, refined, and purified forms of flax-seed oil, rape-seed oil, castor oil, beet-root oil, soya oil, and sunflower oil.

26. A dispersion adhesive according to claim 1, in which said carrier medium comprises an oil that is one or more members selected from the group consisting of natural, refined, and purified forms of rape-seed oil, castor oil, and soya oil.

27. A dispersion adhesive according to claim 1, in which said carrier medium comprises an oil that is one or more members selected from the group consisting of natural, refined, and purified forms of rape-seed oil.

28. A dispersion adhesive according to claim 1, in which said carrier medium comprises an oil that is one or more members selected from the group consisting of natural, refined, and purified forms of castor oil.

29. A dispersion adhesive according to claim 1, in which said carrier medium comprises an oil that is one or more members selected from the group consisting of natural, refined, and purified forms of soya oil.

30. A dispersion adhesive according to claim 1, in which said carrier medium comprises esters of mixtures of saturated and unsaturated $C_{14}$ to $C_{22}$ fatty acids of vegetable origin with monovalent $C_1$ to $C_{12}$ alcohols.

31. A dispersion adhesive according to claim 1, in which said carrier medium comprises esters of tall oil fatty acid mixtures with $C_1$ to $C_8$ alcohols.

32. A dispersion adhesive according to claim 1, in which said carrier medium comprises one or more members selected from the group consisting of methyl, butyl, and 2-ethylhexyl esters of tall oil fatty acid mixtures.

33. A dispersion adhesive according to claim 1, in which said carrier medium comprises butyl esters of tall oil fatty acid mixtures.

34. A process for the production of a resin preparation according to claim 1, said process comprising:
(a) charging a heated mixing container with said carrier medium in liquid form,
(b) heating said carrier medium to a temperature of 20 to 130° C., and
(c) admixing said resins with said heated carrier medium under agitation while maintaining a temperature of 20 to 130° C.

35. A process according to claim 34, in which (b) comprises heating said carrier medium to a temperature of 70 to 90° C., and (c) comprises maintaining a temperature of 70 to 90° C.

36. A process according to claim 34, in which (c) comprises mixing said resins sufficiently to achieve a homogeneous mixture.

37. A process for the production of a dispersion adhesive according to claim 1, in which said resin preparation is kept at a temperature of 30° C. to 90° C. and is admixed under agitation to an aqueous dispersion, which is kept at a temperature of 20° C. to 90° C., the resulting mixture being agitated until homogeneous.

38. A method for gluing planar structures together, said method comprising applying to said structures a dispersion adhesive comprising a resin preparation according to claim 1.

39. A method according to claim 38, in which said planar structures are made of one or more members selected from group consisting of ceramics, stone, wood, plastics, textiles, paper, and cardboard.

40. A method according to claim 38, in which said planar structures are a member selected from the group consisting of floor, wall and ceiling coverings made of one or more members selected from group consisting of ceramics, polyvinylchloride, polyolefin, rubber, textiles, linoleum, work, and wood.

41. A method according to claim 38, in which said dispersion adhesive consists of 40 to 95% by weight of liquid polymer dispersions or emulsions, the balance consisting of said resin preparation.

42. A method according to claim 41, in which said liquid polymer dispersion or emulsions further contain one or more members selected from the group consisting of additional dispersants, anti-foaming agents, preservatives, thickeners, regulating agents, adhesives, and fillers.

43. A method according to claim 38, in which said dispersion adhesive contains 8 to 55% by weight of said resin preparation.

44. A method according to claim 38, in which said dispersion adhesive contains 10 to 50% by weight of said resin preparation.

45. A method according to claim 38, in which said dispersion adhesive contains 12 to 45% by weight of said resin preparation.

46. A method according to claim 38, in which said dispersion adhesive contains 14 to 40% by weight of said resin preparation.

47. A method according to claim 38, in which said dispersion adhesive contains 16 to 36% by weight of said resin preparation.

48. A method according to claim 38, in which said dispersion adhesive contains 18 to 33% by weight of said resin preparation.

49. A method according to claim 38, in which said dispersion adhesive contains 20 to 30% by weight of said resin preparation.

50. A method according to claim 38, in which said dispersion adhesive contains said resin preparation, which contains 30 to 88% by weight of said resins and 70 to 12% by weight of said oils.

51. A method according to claim 38, in which said dispersion adhesive contains said resin preparation, which contains 40 to 86% by weight of said resins and 60 to 14% by weight of said oils.

52. A method according to claim 38, in which said dispersion adhesive contains said resin preparation, which contains 50 to 84% by weight of said resins and 50 to 16% by weight of said oils.

53. A method according to claim 38, in which said dispersion adhesive contains said resin preparation, which contains 60 to 82% by weight of said resins and 40 to 18% by weight of said oils.

54. A method according to claim 38, in which said dispersion adhesive contains said resin preparation, which contains 65 to 80% by weight of said resins and 35 to 20% by weight of said oils.

55. A method according to claim 38, in which said resins are one or more members selected from the group consisting of balsamic resins, root resins, tall resins, and hydrogenated, dehydrogenated, disproportionated, or polymerized derivatives of balsamic, root or tall resins.

56. A method according to claim 38, in which said resins are one or more members selected from the group consisting of esters of colophonium resins with mono or polyvalent alcohols, and esters of hydrogenated, dehydrogenated, disproportionated, or polymerized derivatives of colophonium resins with mono or polyvalent alcohols.

57. A method according to claim 38, in which said resins are one or more members selected from the group consisting of methyl, butyl, ethylene glycol, diethylene glycol, triethylene glycol, glycerol, and pentaerythritol esters of colophonium resins and of hydrogenated, dehydrogenated, disproportionated, or polymerized derivatives of colophonium resins.

58. A method according to claim 38, in which said resins are one or more members selected from the group consisting of colophonium resins and hydrogenated, dehydrogenated, disproportionated, or polymerized derivatives of colophonium resins, modified by paraformaldehyde.

59. A method according to claim 38, in which said resins are mixtures of resin acids consisting of essentially unsaturated carboxylic acids having the molecular formula $C_{20}H_{30}O_2$, and hydrogenated, dehydrogenated, disproportionated, or polymerized derivatives derivatives thereof.

60. A method according to claim 38, in which said resins are mono or polyvalent alcohol esters of mixtures of resin acids consisting of essentially unsaturated carboxylic acids having the molecular formula $C_{20}H_{30}O_2$, and hydrogenated, dehydrogenated, disproportionated, or polymerized derivatives derivatives thereof.

61. A method according to claim 38, in which said resins are mixtures of resin acids consisting of essentially unsaturated carboxylic acids having the molecular formula $C_{20}H_{30}O_2$, and hydrogenated, dehydrogenated, disproportionated, or polymerized derivatives derivatives thereof, modified by paraformaldehyde.

62. A method according to claim 38, in which said resins are liquid at room temperature.

63. A method according to claim 38, in which said resins are natural mixtures of glycerol esters of essentially $C_{14}$–$C_{22}$ fatty acids.

64. A method according to claim 38, in which said carrier medium comprises an oil that is one or more members selected from the group consisting of natural, refined, and purified forms of flax-seed oil, rape-seed oil, castor oil, beet-root oil, soya oil, and sunflower oil.

65. A method according to claim 38, in which said carrier medium comprises an oil that is one or more members selected from the group consisting of natural, refined, and purified forms, rape-seed oil, castor oil, and soya oil.

66. A method according to claim 38, in which said carrier medium comprises an oil that is one or more members selected from the group consisting of natural, refined, and purified forms of rape-seed oil.

67. A method according to claim 38, in which said carrier medium comprises an oil that is one or more members selected from the group consisting of natural, refined, and purified forms of castor oil.

68. A method according to claim 38, in which said carrier medium comprises an oil that is one or more members selected from the group consisting of natural, refined, and purified forms of soya oil.

69. A method according to claim 38, in which said carrier medium comprises esters of mixtures of saturated and unsaturated $C_{14}$ to $C_{22}$ fatty acids of vegetable origin with monovalent $C_1$ to $C_{12}$ alcohols.

70. A method according to claim 38, in which said carrier medium comprises esters of tall oil fatty acid mixtures with $C_1$ to $C_8$ alcohols.

71. A method according to claim 38, in which said carrier medium comprises one or more members selected from the group consisting of methyl, butyl, and 2-ethylhexyl esters of tall oil fatty acid mixtures.

72. A method according to claim 38, in which said carrier medium comprises butyl esters of tall oil fatty acid mixtures.

73. A method according to claim 38, in which said resin preparation is prepared by
  (a) charging a heated mixing container with said carrier medium in liquid form,
  (b) heating said carrier medium to a temperature of 20 to 130° C., and
  (c) admixing said resins with said heated carrier medium under agitation while maintaining a temperature of 20 to 130° C.

74. A method according to claim 73, in which (b) comprises heating said carrier medium to a temperature of 70 to 90° C., and (c) comprises maintaining a temperature of 70 to 90° C.

75. A method according to claim 73, in which (c) comprises mixing said resins sufficiently to achieve a homogeneous mixture.

76. A method according to claim 38, in which said dispersion adhesive is prepared by admixing said resin preparation, which is kept at a temperature of 30° C. to 90° C. and is admixed under agitation to an aqueous polymer dispersion, which is kept at a temperature of 20° C. to 90° C., the resulting mixture being agitated until homogeneous.

* * * * *